United States Patent [19]

Kyogoku et al.

[11] 4,415,886
[45] Nov. 15, 1983

[54] RESIDUAL INK DETECTION MECHANISM

[75] Inventors: Hiroshi Kyogoku, Yokohama; Shigemitsu Tazaki, Matsudo; Koji Terasawa, Mitaka; Shigeru Okamura, Yokohama, all of Japan

[73] Assignee: Canon Kabushiki Kaisha, Tokyo, Japan

[21] Appl. No.: 290,505

[22] Filed: Aug. 6, 1981

[30] Foreign Application Priority Data

Aug. 12, 1980 [JP] Japan .................................. 55-109805

[51] Int. Cl.³ .............................................. G08B 21/00
[52] U.S. Cl. .................................. 340/618; 73/304 C; 101/366
[58] Field of Search ............... 340/612, 618, 620, 657; 137/392; 73/718, 724, 304 C; 101/364, 366; 346/140 A, 140 R

[56] References Cited

U.S. PATENT DOCUMENTS 3,992,706 11/1976 Tunney et al. ...................... 340/618
4,202,267 5/1980 Heinzl et al. ..................... 73/304 C
4,295,370 10/1981 Bristol ............................. 73/304 C

*Primary Examiner*—Gerald L. Brigance
*Attorney, Agent, or Firm*—Fitzpatrick, Cella, Harper & Scinto

[57] ABSTRACT

A residual ink detection mechanism for detecting the amount of residual ink within an ink container of an ink jet printer is disclosed wherein the ink container comprises a flexible bag, and electrodes are provided at least at opposite positions of this bag to constitute a capacitor, so that the amount of residual ink within the ink container may be detected by detecting the electrostatic capacity between these paired electrodes.

5 Claims, 12 Drawing Figures

FIG. 6A             FIG. 6B
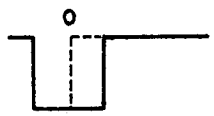
FIG. 6C             FIG. 6D
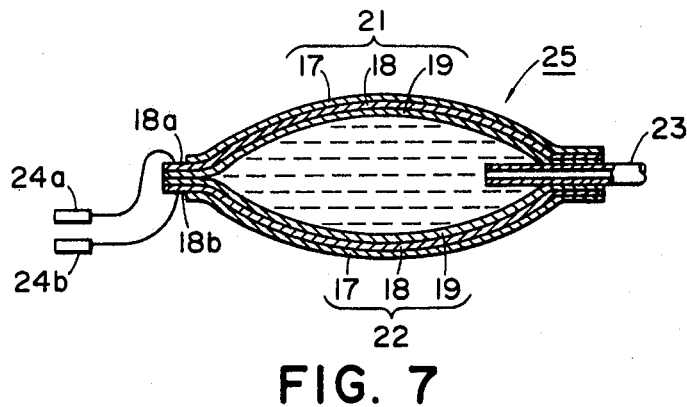
FIG. 7
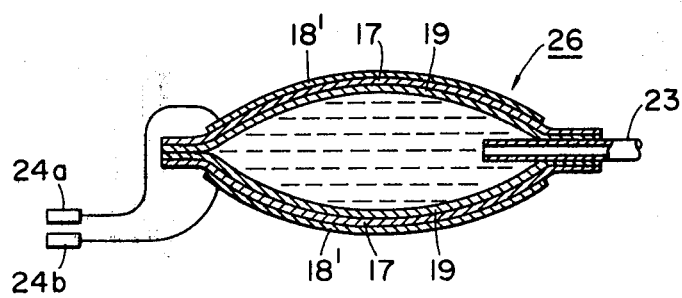
FIG. 8

RESIDUAL INK DETECTION MECHANISM

BACKGROUND OF THE INVENTION

1. Field of the Invention

The present invention relates to a residual ink detection mechanism. More specifically, the present invention relates to a residual ink detection mechanism for detecting the amount of residual ink within an ink container of an ink jet printer.

2. Description of the Prior Art

With a conventional ink jet printer, drops of liquid ink are ejected onto a printing paper sheet for recording. An ink container for holding the ink must satisfy the following requirements:

1. The ink must not leak during vibrations or impacts in order not to contaminate the surrounding environment.
2. The structure must substantially prevent evaporation of ink components to keep constant the physical characteristic of the ink, such as the surface tension and viscosity.
3. An alarm must be generated for signaling the need for supplementing the ink when there is little ink left in the ink container.

FIGS. 1A and 1B show a residual ink detection mechanism using an ink container satisfying the requirements described above.

In the mechanism shown in FIG. 1A, a float 3 incorporating a magnet floats in a side channel 5 of an ink container 1, and a lead switch 4 is arranged opposite to this side channel 5. When a little ink 2 is left inside the container 1, the float 3 inside the side channel 5 descends as the level of the ink 2 lowers, so that the lead switch may be operated and the amount of residual ink may be detected. Another mechanism shown in FIG. 1B detects the amount of residual ink by a light-emitting means 6 and a photosensitive means 7 in place of the lead switch 4. When the amount of opaque ink decreases to below a predetermined level, the photosensitive means 7 receives light from the light-emitting means 6 thereby detecting the level of the residual ink. In the ink containers 1 as shown in FIGS. 1A and 1B, the residual ink detection mechanisms as shown in FIGS. 1A and 1B may be adopted.

However, a new type of ink jet printer has recently been developed wherein the ink is not under pressure, but rather a voltage is applied as necessary to eject the ink. The residual ink detection mechanisms as described above are not effectively applicable to the ink containers of the ink jet printers of this new type. This is because the ink containers of the ink jet printers of new type are flat and thin.

FIG. 2 shows such an ink container. As shown in this figure, ink 11 is filled in a flat ink bag 10 or triple-layered structure, the overall ink bag 10 is housed inside a casing 13 having a ventilation hole 12, and the ink 11 is supplied to the exterior through an outlet pipe 14 arranged inside the ink bag 10 and through a rubber stopper 15. The ink is supplied by connecting a needle 16 to the outlet pipe 14 inserted into the rubber stopper 15. The ink bag 10 comprises, for example, as shown in FIG. 3, a nylon plastic thin film 17 having a thickness of 5 to 10μ for external protection, an aluminum thin film 18 having a thickness of about 10μ for preventing evaporation of the ink and deterioration of the ink by ultraviolet radiation or the like, and an inner main bag 19 consisting of a polyethylene thin film having a thickness of 50 to 70 μ.

In the case of a flat thin ink bag of the construction as described above, supply of fresh ink is performed by replacing the old casing with a new casing. The ink bag 10 is a flat bag, and the level shift of the ink from the full to the empty condition is thus only about 10 mm at maximum. The ink bag 10 is easily deformable by atmospheric pressure since it is a flat and flexible bag. Therefore, the ink level may be kept constant. However, such an ink bag of the flat and thin type has drawbacks in that the residual ink detection mechanisms as described above may not be used and correct detection of the amount of the residual ink is difficult.

SUMMARY OF THE INVENTION

It is an object of the present invention to provide a residual ink detection mechanism for use with a thin, flexible ink bag with which the amount of residual ink may be correctly detected.

It is another object of the present invention to provide a residual ink detection mechanism which is less expensive than conventional mechanisms.

BRIEF DESCRIPTION OF THE DRAWING

FIGS. 4 to 6 correspond to one embodiment of the present invention, wherein FIG. 4 is a plan view of the ink bag, FIG. 5 is a circuit diagram of a circuit for detecting changes in the capacitance of a capacitor, and FIGS. 6A to 6D are views showing the waveforms at the respective parts of the circuit shown in 7 and 8 show other embodiments of the present invention respectively.

DESCRIPTION OF THE PREFERRED EMBODIMENTS

Figure 1A:
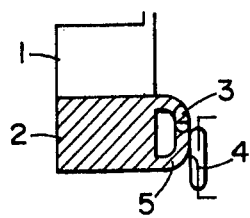
FIGS. 1A and 1B are sectional views showing structures of conventional residual ink detection mechanisms.
Figure 1B:
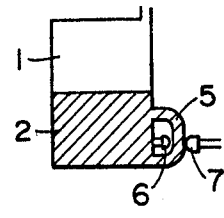
Figure 2:
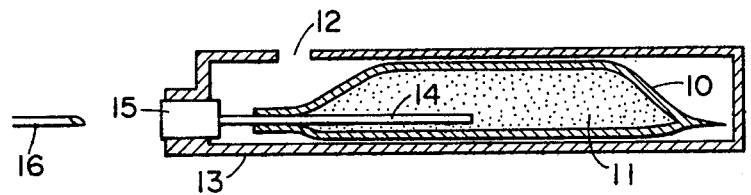
FIG. 2 is a sectional view showing the structure of an ink bag used according to the present invention.
Figure 3:
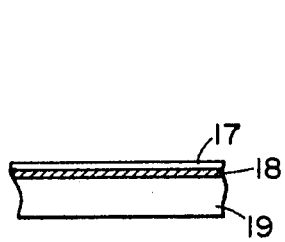
FIG. 3 is an enlarged sectional view showing part of the ink bag shown in FIG. 2.
Figure 4:
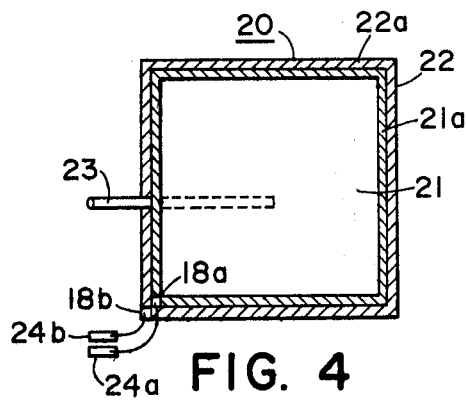

FIG. 4 shows a flexible, flat ink bag 20 similar to the ink bag 10 shown in FIG. 2. The ink bag 20, as shown in FIG. 3, comprises a triple-layered, composite plastic laminate film having at its center a flexible metal thin film, for example, the aluminum thin film 18. The ink bag 20 is formed by sealing with heat or an adhesive the peripheries of a separate upper sheet 21 and lower sheet 22, each consisting of a composite plastic film as described above. An ink outlet pipe 23 is disposed inside this ink bag 20. Sealing is performed while maintaining a difference between the sizes of the upper sheet 21 and the lower sheet 22. In other words, referring to FIG. 4, an inner hatched part 21a is the sealing part of the upper sheet 21 and the lower sheet 22, and an outer hatched part 22a is the projecting part of the lower sheet 22 extending beyond the upper sheet 21. Parts of the plastic material of the upper sheet 21 and the lower sheet 22 are removed in order to form aluminum thin film exposed parts 18a and 18b on the same side, and contacts 24a and 24b are connected thereto. In this manner, the aluminum thin films of the upper sheet 21 and the lower sheet 22 may function as a pair of electrodes, each of which is insulated by plastic thin films on both surfaces, thereby forming a capacitor. According to experimental results, when the ink bag has a size of about 10 $cm^2$ and the ink is filled therein to its maximum capacity, the electrostatic capacity of the capacitor formed thereby is within the range of 150 to 250 pF. When the ink bag is empty, the electrostatic capacity is within the range of 350 to 450 pF, thus providing a two- or three-fold change in capacitance. In this embodiment, the upper sheet 21 and lower sheet 22 were sealed while maintaining a difference in the sizes therebetween for the purpose of forming the aluminum thin film exposed parts 18a and 18b on the same side of the ink bag. However, if the respective exposed parts 18a and 18b are to be formed at opposite sides or portions of the ink bag as shown in FIG. 7, the upper sheet 21 and the lower sheet 22 may be of the same size. Therefore, it is sufficient that the aluminum thin films of the respective sheets are insulated from each other. Furthermore, in the embodiment described above, the ink bag consisted of composite plastic films, each having an aluminum thin film. However, the present invention may alternatively be practiced with composite plastic films which do not have metal thin films such as aluminum thin films (FIG. 8). In such a case, two metal thin films may be attached at opposite flat parts of the ink bag to provide electrodes.

Figure 5:
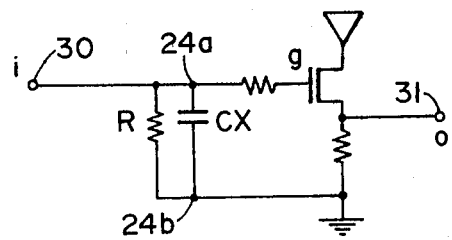

The contacts 24a and 24 b are, as shown in FIG. 5, connected between ground and an input terminal 30, and a capacitor CX formed thereby is connected to a gate g of an inverter. Pulses as shown in FIG. 6A are input to the input terminal 30. Predetermined signals are generated at an output terminal 31 of the inverter according to the signal representing the electrostatic capacity of the capacitor CX. The pulse width of these signals is measured according to clock pulses shown in FIG. 6B.

With a residual ink detection mechanism of this construction, when a sufficient amount of ink is present in the ink bag, the capacitance of the capacitor formed by the aluminum thin films of the upper sheet 21 and the lower sheet 22 remains small. When the amount of residual ink becomes small and the aluminum thin films of the upper sheet 21 and the lower sheet 22 come close together, the capacitance of the capacitor becomes greater.

The capacitance of the capacitor is detected by the circuit of the circuit diagram shown in FIG. 5. When the pulses as shown in FIG. 6A are periodically input at the input terminal 30 of the circuit shown in FIG. 5, the waveform at the gate g becomes as shown in FIG. 6B, according to the capacitance of the capacitor CX. When the amount of residual ink is great and the electrostatic capacity is correspondingly small, an attenuated waveform as shown by the dotted line is obtained. As the amount of residual ink decreases and the electrostatic capacity correspondingly increases, an attenuated waveform as shown by the solid line is obtained. Consequently, a waveform as shown in FIG. 6C appears at the output terminal 31 of the inverter, and the pulse (separation) period is measured by counting the clock pulses as shown in FIG. 6D. The detection mechanism may, thus, be arranged so that an alarm sound may be generated when the amount of residual ink decreases, the capacitance of the capacitor increases, and the count of the clock pulses exceeds a predetermined value. The detection of the difference in the pulse width may be easily accomplished with clock pulses from an LSI used for control of the ink jet printer.

In summary, in accordance with the present invention, the amount of residual ink is detected by detection of the electrostatic capacity of the capacitor formed by attaching at least a pair of electrodes to opposite parts of the flexible ink bag, so that the detection of the amount of residual ink may be easily accomplished with a simple construction, with certainty, at relatively less cost and without requiring significant modifications of the ink container.

What we claim is:

1. A residual ink detection mechanism, comprising:
   an ink housing case made of a flexible material and being formed into a closed bag which deforms in accordance with the amount of ink therein, said ink housing case having at least two electrodes with each one provided at opposite portions of said ink housing case;
   a pair of contacts each one of said pair of contacts connected to a different electrode; and
   means connected to said pair of contacts, for detecting the amount of ink in said ink housing case by detection of the electrostatic capacity between said electrodes.

2. A residual ink detection mechanism, comprising:
   a flexible ink bag being formed by sealing together an upper sheet and a lower sheet, each sheet including a flexible composite laminate film having a metal thin film and plastic thin films;
   a pair of contacts each connected to the metal thin film of a different one of said upper and lower sheets; and
   means connected to said pair of contacts for detecting the amount of ink in said ink bag by detection of the electrostatic capacity between the metal thin films.

3. A residual ink detection mechanism according to claim 2, wherein said detecting means includes means for detecting the electrostatic capacity by converting the electrostatic capacity into a pulse width.

4. A residual ink detection mechanism, comprising:
   an ink bag formed by sealing together a separate upper sheet and lower sheet, each sheet including a flexible composite film having a metal thin film sandwiched between plastic thin films so as to be electrically insulated; and
   a pair of contacts, one contact connected to the metal thin film of said upper sheet and the other contact connected to the metal thin film of said lower sheet, both contacts being connected to a reisudal ink detecting circuit which receives signals from a signal source.

5. A residual ink detection mechanism according to claim 4, wherein said lower sheet is sized larger than said upper sheet so that said lower sheet has a peripheral projecting portion, said lower sheet and said upper sheet when joined together by sealing having parts of their plastic films removed to expose parts of their metal thin film whereat said pair of contacts connect.

* * * * *

UNITED STATES PATENT AND TRADEMARK OFFICE
CERTIFICATE OF CORRECTION

PATENT NO. : 4,415,886
DATED : November 15, 1983
INVENTOR(S) : HIROSHI KYOGOKU, ET AL.

It is certified that error appears in the above-identified patent and that said Letters Patent is hereby corrected as shown below:

Claim 4, line 10 (Column 4, line 52), "reisudal" should be --residual--.

Signed and Sealed this

Thirteenth Day of March 1984

[SEAL]

Attest:

GERALD J. MOSSINGHOFF

Attesting Officer          Commissioner of Patents and Trademarks